United States Patent [19]

Harper

[11] Patent Number: 5,137,054

[45] Date of Patent: Aug. 11, 1992

[54] FLOW AND PRESSURE RESPONSIVE VALVE

[75] Inventor: Dewey Harper, Springdale, Ark.

[73] Assignee: Crystal Fluid Power, Inc., Grand Rapids, Mich.

[21] Appl. No.: 806,236

[22] Filed: Dec. 12, 1991

[51] Int. Cl.$^5$ .............................................. F16K 17/22
[52] U.S. Cl. .................... 137/614.19; 137/498
[58] Field of Search ............... 137/613, 614.19, 504, 137/498, 456

[56] References Cited

U.S. PATENT DOCUMENTS

| | | | |
|---|---|---|---|
| 2,936,780 | 5/1960 | Pratt | 137/456 X |
| 3,542,067 | 11/1970 | Douglas | 137/614.19 X |
| 4,352,372 | 10/1982 | Kolge | 137/504 |

Primary Examiner—John C. Fox
Attorney, Agent, or Firm—Richard C. Litman

[57] ABSTRACT

A flow and pressure responsive valve which blocks upstream flow in the event of a break in a downstream line. Included is a solenoid valve positioned adjacent an inlet port, a pressure sensitive switch, and a velocity fuse positioned adjacent the outlet port. The pressure sensitive switch is tied to a cavity in common with the solenoid valve. The pressure sensitive switch activates the solenoid valve at a predetermined pressure threshold to permit the fluid to flow through the inlet port. The velocity fuse is calibrated to permit the fluid to flow at a nominal flow rate and when the fluid flow exceeds this rate, the velocity fuse shuts off fluid flow through the outlet port. In the event of a break in a line downstream that permits the pressure to drop below the predetermined pressure threshold or permits the flow rate to exceed the nominal flow rate, the pressure sensitive switch will, respectively, deactivate the solenoid valve and shut off the fluid flow through the inlet port or the velocity fuse will shut off the fluid flow through the outlet port. If either the pressure sensitive valve or the velocity fuse fail, the device will still restrict the fluid flow.

8 Claims, 3 Drawing Sheets

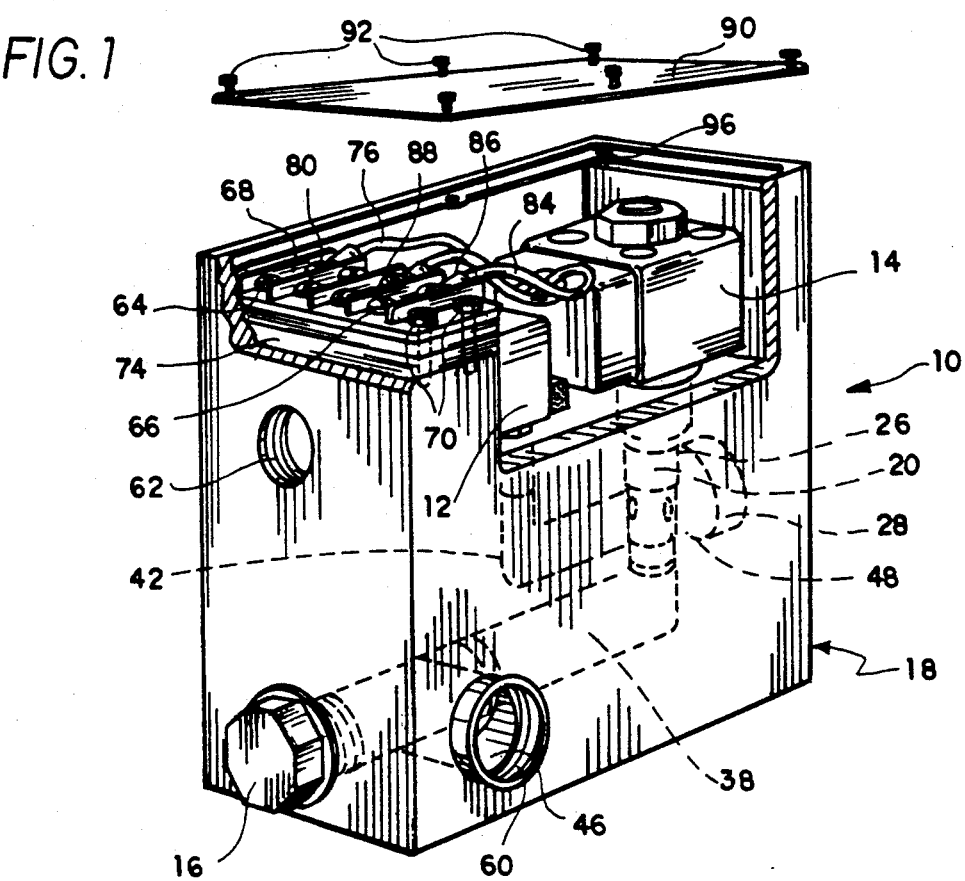
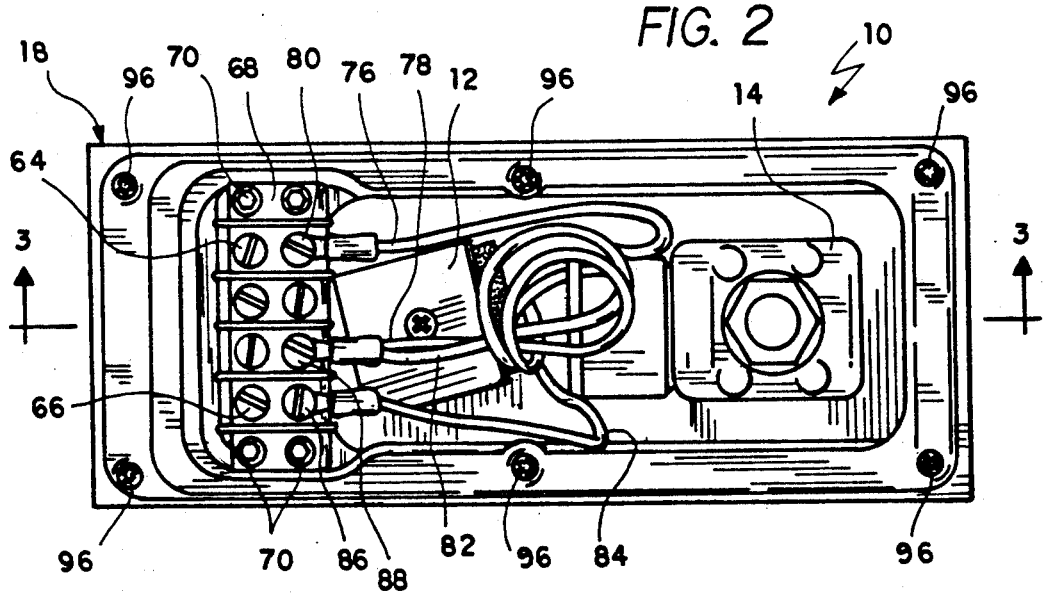

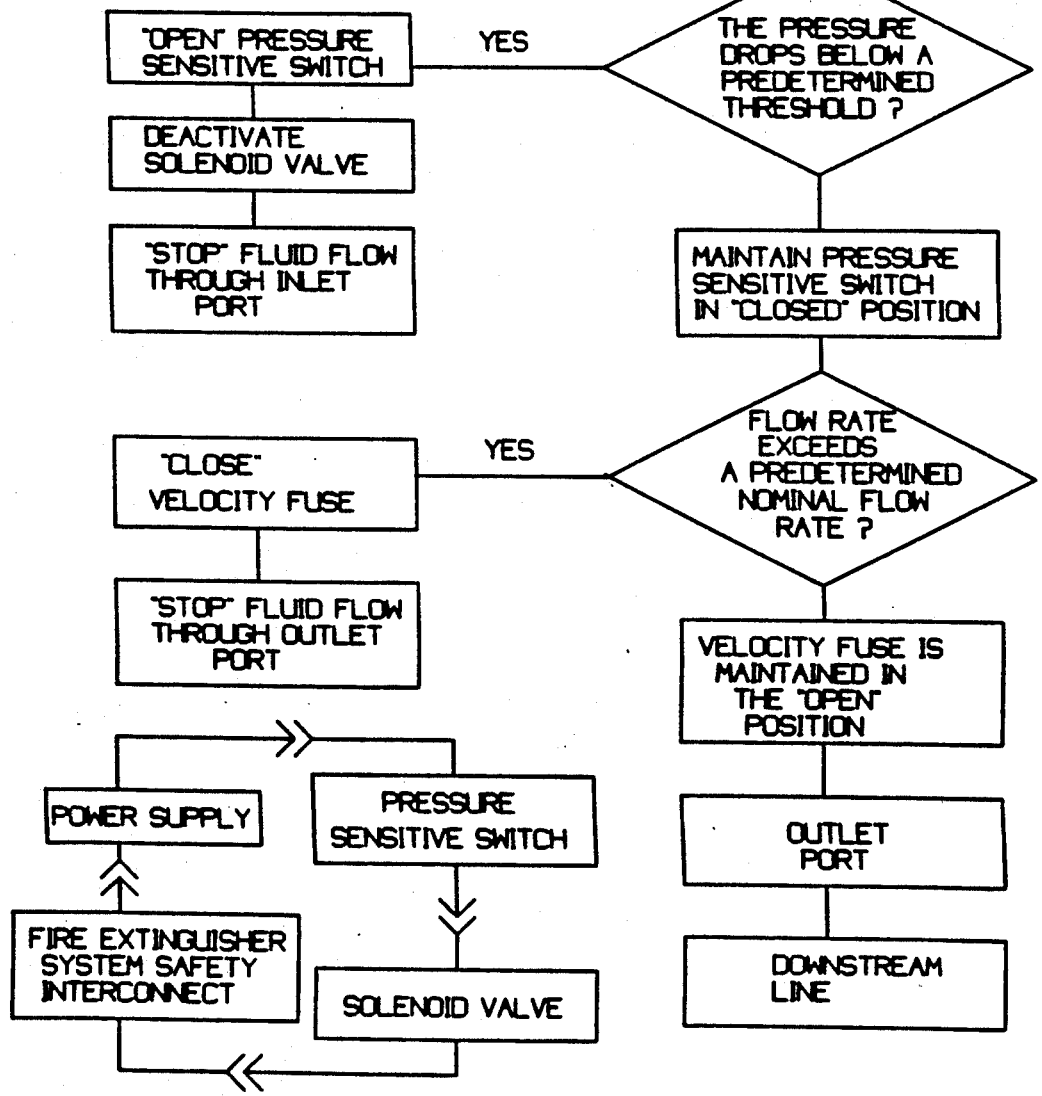

FLOW AND PRESSURE RESPONSIVE VALVE

BACKGROUND OF THE INVENTION

1. Field of the Invention

The present invention relates to a valve assembly which monitors flow and pressure.

2. Description of Prior Art

Various control devices are available which monitor and control fluid flow lines. The most common control devices which prevent the fluid flow from continuing downstream in the event of a ruptured line are velocity fuses and pressure sensitive switches. If only a single control device is used and it fails, the fluid is still permitted to flow. A combination of control devices would ensure a restriction in flow and reduce the risk of failure involved with the use of a single control device. It would be convenient to combine a series of control devices in a single device or structure of unitary construction. Such a device would be a redundant control device including a plurality of devices each having a functional characteristic dependent on a different stimuli yet each capable of accomplishing the same effect.

There are control devices in existence which sense and control fluid flow each in response to a certain stimulus, such as pressure or flow rate, but these devices are not known to be used in combination in a single structure.

U.S. Pat. No. 3,416,560 issued Dec. 17, 1968 to Peter Bruno discloses an apparatus for monitoring fluid transfer systems which senses leaks that may develop within the system and automatically shuts off the fluid supply upon sensing a leak downstream.

U.S. Pat. No. 3,568,705 issued Mar. 9, 1971 to George I. Boyadjieff discloses a hydraulic circuit breaker or fail-safe device for sensing leaks in lines routed to and from hydraulic actuators.

U.S. Pat. No. 4,010,770 issued Mar. 8, 1977 to Clifford M. Peters discloses a velocity flow control valve employed in a safety system for closing a valve across a main flow line upon a downstream drop in pressure.

U.S. Pat. No. 4,188,971 issued Feb. 19, 1980 to N. Stuart Otteson discloses a valve disposed in a system for cutting off the flow of fluid from an source leading to a fluid-using environment upon the occurrence of either an excess high fluid rate or an excess pressure condition experienced in or near the fluid using environment.

U.S. Pat. No. 4,274,378 issued Jun. 23, 1981 to Carl O. Pedersen discloses an automatice hydraulic shut-off system for use with a hydraulic valve and a work apparatus which retains the work apparatus under pressure even when a hydraulic line has inadvertently broken.

U.S. Pat. No. 4,278,011 issued Jul. 14, 1981 to Donald J. Parquet discloses an automatic hydraulic shut-off system for use with a hydraulic valve and a work apparatus which retains the work apparatus under pressure even when a hydraulic line has inadvertently broken.

U.S. Pat. No. 4,355,654 issued Oct. 26, 1982 to Paul N. Levesque discloses a device for monitoring fluid flow in a pair of conduits and blocking fluid flow to the conduits when leakage of fluid is sensed.

None of the above inventions and patents, taken either singly or in combination, is seen to describe the instant invention as claimed.

SUMMARY OF THE INVENTION

The present invention relates to a flow and pressure responsive valve which interrupts a flow of fluid from a source in the event of a break in a downstream line. The flow and pressure responsive valve is comprised of a solenoid valve, a pressure sensitive switch, and a velocity fuse supported by an enclosure. The solenoid valve is positioned adjacent the inlet port and the velocity fuse is positioned adjacent the outlet port. The pressure sensitive switch is tied to the same cavity as the solenoid valve and activates the solenoid valve if the pressure in the cavity reaches a predetermined threshold. The velocity fuse is calibrated to permit the fluid to flow at a nominal flow rate and if the flow rate is exceeded, the velocity fuse terminates the fluid flowing through the outlet port. If a break in a downstream line results in a pressure drop below the predetermined pressure threshold or results in a flow rate in excess of the nominal flow rate, the pressure sensitive switch will deactivate the solenoid valve and impede the flow of fluid downstream or the velocity fuse will close and detain the fluid from proceeding downstream. If either the pressure sensitive switch or the velocity fuse fail, the device will, nonetheless, restrict the flow of fluid from continuing downstream.

Accordingly, one object of the present invention is to provide a solitary fluid flow control device which senses both an increase in a fluid flow rate and a decrease in a fluid pressure as a result of a ruptured line downstream, thus proving a redundant control device.

Another object of the present invention is to provide a solitary fluid flow control device which upon sensing a predetermined change in a plurality of stimuli controls or blocks the fluid flow accordingly, thus providing a series of backup devices.

These and other objects of the present invention will become readily apparent upon further review of the following specification and drawings.

BRIEF DESCRIPTION OF THE DRAWINGS

FIG. 1 is a partially cutaway perspective view of the present invention with the access cover removed showing the end containing the velocity fuse.

FIG. 2 is a top plan view of the present invention with the access cover removed.

FIG. 5 is a block diagram of the present invention illustrating the function of the apparatus.

FIG. 6 is a schematic diagram of the circuit of the present invention including the power source, the pressure sensitive switch, and the solenoid valve.

FIG. 7 is a schematic diagram of the circuit of the present invention including the power source, the pressure sensitive switch, and the solenoid valve in series with a fire extinguisher system safety interconnect.

Similar reference characters denote corresponding features consistently throughout the attached drawings.

DETAILED DESCRIPTION OF THE PREFERRED EMBODIMENT

Figure 3:
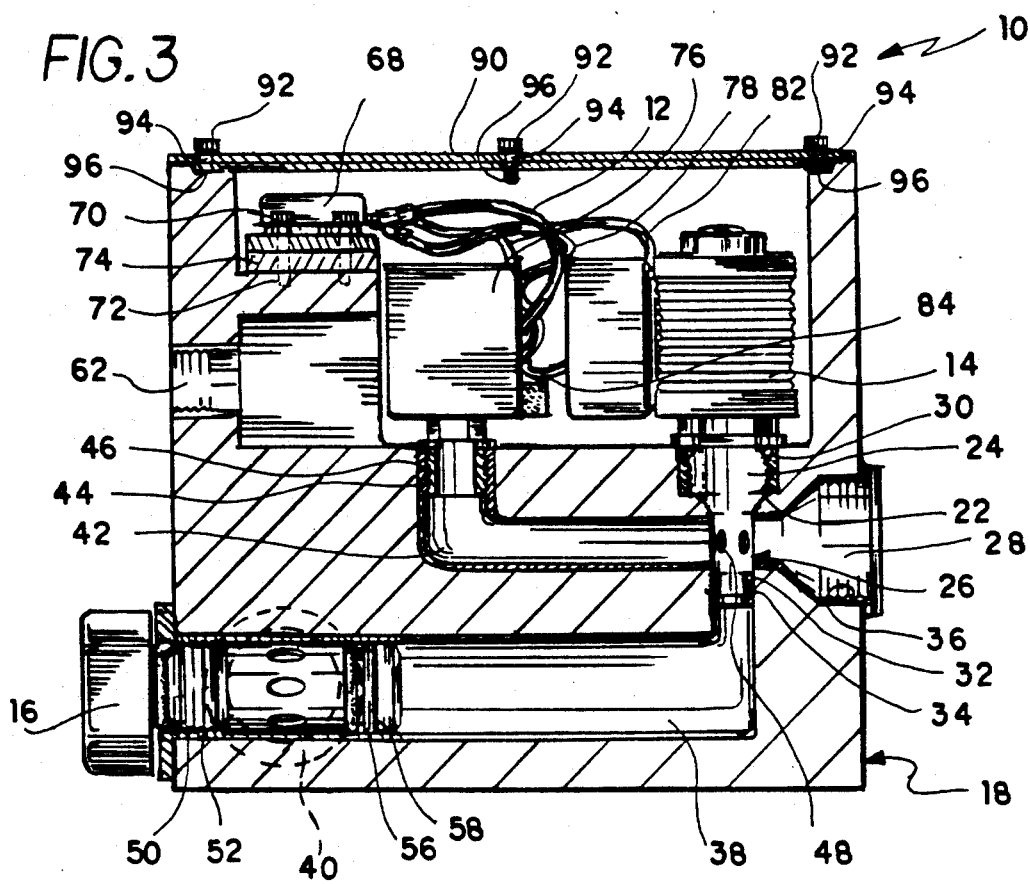
FIG. 3 is a side elevational partial cross-sectional view of the present invention taken along the line 3—3 shown in FIG. 2.

Referring to the drawings, FIG. 1 and FIG. 3 show the device or the flow and pressure responsive valve 10 which is comprised mainly of a pressure sensitive switch 12, a solenoid valve 14, and a velocity fuse 16 contained within an enclosure 18. The enclosure 18 is fabricated from a solid block of aluminum. The solenoid valve 14 includes a cartridge 20 which extends from the bottom of the solenoid valve 14. The solenoid valve 14 is threadably attached by mating male and female threads 22, 24 within a first chamber 26 adjacent an inlet port 28. An O-ring 30 and seals 32, 34 are provided to ensure a substantially tight seal. The inlet port 28 is threaded with threads 36 to facilitate the connection of an upstream line or fluid source 110. When the solenoid valve 14 is activated, fluid entering the inlet port 28 is permitted to pass through the cartridge 20 and enter into a third chamber 38 leading to an outlet port 40. However, when the solenoid valve 14 is deactivated, fluid is blocked from entering the third chamber 38 from the inlet port 28. The first chamber 26 is arranged perpendicular to the inlet port 28. A second chamber 42, having the pressure sensitive switch 12 threadably attached therein by mating male and female national pipe threads 44, 46 to form a tight seal, intersects the first chamber 26 opposite the inlet port 28. Since the first and second chambers 26, 42 are both in common with the inlet port 28, the fluid pressure sensed by the pressure sensitive switch 12 is the same as that entering through the inlet port 28. Even when the solenoid valve 14 is closed to restrict the fluid flow to the third chamber 38, a pilot 48 is provided to permit fluid to flow to the pressure sensitive switch 12. The pressure sensitive switch 12 is a normally open switch which is placed in series with a power source 112 and the solenoid valve 14 to activate the solenoid valve 14. The pressure sensitive switch 12 remains closed until the fluid entering the second chamber 42 from the inlet port 28 via the pilot 48 exceeds a predetermined threshold. If the fluid pressure does not exceed this predetermined pressure threshold, the current is interrupted to the solenoid valve 14, thus deactivating the solenoid valve 14 and restricting the flow of fluid entering through the inlet port 28 to the third chamber 38. The third chamber 38 leads to the velocity fuse 16 which is threadably attached by mating male and female threads 50, 52 adjacent and perpendicular to an outlet port 40. An O-ring 54 and seals 56, 58 seals are provided to ensure a tight seal. The outlet port 40 is threaded with threads 60 to facilitate the connection of a downstream line 106 (denoted in FIG. 5). The velocity fuse 16 permits the flow of fluid through the outlet port 40 as long as the flow rate does not exceed a predetermined nominal flow rate. Providing that the fluid pressure exceeds the predetermined threshold and the flow rate does not exceed the predetermined nominal flow rate, the fluid will flow through the device 10.

Figure 4:
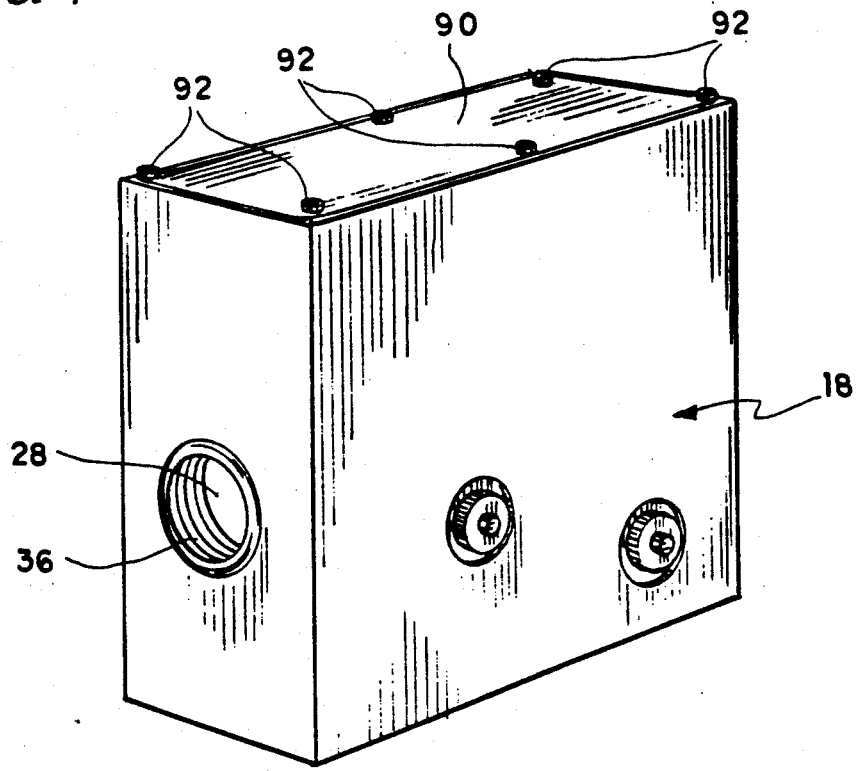
FIG. 4 is a perspective view of the present invention showing the inlet port end.

Now referring to FIG. 2 and FIG. 6, the power source 112 enters the device 10 through a threaded bore 60 and is connected to two separate points 62, 64 located on a terminal strip 68 within the cavity 69. The terminal strip 68 is fastened to the enclosure 18 by threaded studs 70 which mate with threaded bores 72. A nonconductive bar 74 is provides supplemental support for the terminal strip 68. The pressure sensitive switch 12 includes two leads 76, 78; one lead 76 is connected to a point 80 which is common with the point 64 which is connected to the power source 112. The solenoid valve 14 comprises two leads 82, 84; one lead 82 is connected to a point 86 which is common with the point 66 connected to the power source 112. The circuit is completed by tying the lead 78 of the pressure sensitive switch 12 to the lead 84 of the solenoid valve 14 through the point 88 located on the terminal strip 68. This completes the circuit or series loop 114 which enables the current to flow in series from the power source 112 through to the pressure sensitive switch 12 and the solenoid valve 14. If the pressure of the fluid drops below the predetermined threshold, the pressure sensitive switch 12 returns to its normally open condition interrupting the current flowing through the series loop 114. If the pressure exceeds the predetermined threshold, the pressure sensitive switch 12 is closed and the current is permitted to flow through the series loop 114. As an alternative, the device 10 can be connected in series with the fire extinguisher system safety interconnect 116 as shown in FIG. 7. In the event of a fire, the fire extinguisher system safety interconnect can interrupt the current to the solenoid valve 14, thus blocking the flow of fluid from entering into the third chamber 38 from the inlet port 28. This is especially critical if the fluid is flammable. Once the electrical connections have been completed, an access panel 90 is secured to the enclosure 18 to cover the cavity 69 (as shown in FIG. 4) containing the exposed electrical connections or the terminal strip 68. This is accomplished by inserting the threaded studs 92 through the holes 94 in the access panel 90 and tightening the threaded studs 92 into the mating threaded bores 96.

As shown in FIG. 3 and FIG. 5, the fluid enters in through the inlet port 28 and is permitted through the second chamber 42 to reach the pressure sensitive switch 12. Assuming the pressure exceeds the predetermined pressure threshold and the flow rate does not exceed the predetermined nominal flow rate, the fluid is permitted to flow through the third chamber 38 to reach the velocity fuse 16 where it is permitted to flow through the outlet port 40. If a break occurs in a downstream line 106, the pressure will drop and the flow rate will increase. Moreover, if the break is significant enough to cause the pressure to drop below the predetermined threshold, the pressure sensitive switch 12 will deactivate the solenoid valve 14 terminating the fluid flowing through the inlet port 28 to the third chamber 38 or if the flow rate exceeds the predetermined nominal flow rate the velocity fuse 16 will close terminating the fluid flowing through the outlet port 40. If either the pressure sensitive switch 12 or the velocity fuse 16 fails to operate properly, the device 10 will prevent the fluid from continuing to flow downstream. The closer the device 10 is to an area to be protected, the quicker the device 10 can effect the operational sequence.

In the event of a break in a downstream line 106 and the device blocks the fluid accordingly, a ball valve 108 located between the upstream line and the inlet port 28 is manually closed while the downstream line 106 is repaired. By the time the repair has been completed, the pressure within the device in first and second chambers 26, 42 will have reached a point of equilibrium with the third chamber 38 due to the inefficiency of the seals 32, 34 between the cartridge 20 and the first chamber 26. The pressure within the second chamber 42 and the pressure in the third chamber 38 can be checked through the gauge ports 98, 100, respectively, with a standard gauge. The ball valve 108 need simply be opened and the device 10 will resume normal operation.

It is to be understood that the present invention is not limited to the sole embodiment described above, but encompasses any and all embodiments within the scope of the following claims.

I claim:

1. A device for sensing and controlling fluid flow comprising:

an enclosure having an inlet port for fluid to enter said device and an outlet port for fluid to exit said device;

a valve disposed within said enclosure adjacent said inlet port to regulate said fluid entering said inlet port;

a pressure responsive device disposed within said enclosure to control said valve in response to a predetermined pressure condition; and a flow rate responsive device dispose within said enclosure adjacent said outlet port to govern said fluid flow exiting said outlet port in response to a predetermined flow rate condition;

whereby when said predetermined pressure and flow rate conditions exist, respectively, said pressure responsive device operates said valve to enable said fluid to enter said inlet port and said flow rate responsive device enables fluid to exit said outlet port, and said predetermined pressure and flow rate conditions do not exist, said valve does not enable said fluid to enter said inlet port and said flow responsive device does not enable said fluid to exit through said outlet port, respectively.

2. The device according to claim 1, wherein said valve is a normally closed valve which includes a plunger responsive to a magnetic field created by a coil whereby a current flows through said coil creating said magnetic field which attracts said plunger, said valve achieves an open position, and said fluid enters said inlet port.

3. The device according to claim 1, wherein said pressure responsive device includes a normally open switch whereby, when said predetermined pressure condition exists, said normally open switch achieves a closed position and a current flows through said normally open switch.

4. The device according to claim 1, wherein said predetermined pressure condition is in excess of a minimum pressure threshold.

5. The device according to claim 1, wherein said flow rate responsive device includes a normally open valve which established a closed position to block said fluid exiting said outlet port when predetermined condition does not exist.

6. The device according to claim 1, wherein said predetermined flow rate condition is below a maximum flow rate threshold.

7. The device according to claim 1, wherein said valve and said flow rate responsive device are placed in service, fluid flow is delivered from a fluid source to said device via an upstream line connected to said inlet port, and fluid flow is delivered to a downstream line from said outlet port;

whereby, if said downstream line is ruptured and said predetermined pressure condition is not met and said predetermined flow rate condition is not met and if said pressure responsive device fails to respond to an absence of said predetermined pressure condition, then said flow rate responsive will not enable said fluid flow through said outlet port to said downstream line or if said flow rate responsive device fails to respond to an absence in said predetermined flow rate condition, then said pressure responsive device will respond and said valve will not enable said fluid flow to enter said inlet port.

8. The device according to claim 1, wherein a pilot is provided to enable fluid flow to reach said pressure responsive control device when said valve does not enable fluid flow to enter said inlet port.

* * * * *